(12) United States Patent
Rodriguez

(10) Patent No.: US 12,210,580 B2
(45) Date of Patent: Jan. 28, 2025

(54) SYSTEM FOR VERIFYING DRIVER BIOMETRIC INFORMATION AND VEHICLE INFORMATION TO SATISFY CITATION

(71) Applicant: Lazaro Rodriguez, Miami Lakes, FL (US)

(72) Inventor: Lazaro Rodriguez, Miami Lakes, FL (US)

( * ) Notice: Subject to any disclaimer, the term of this patent is extended or adjusted under 35 U.S.C. 154(b) by 0 days.

(21) Appl. No.: 17/903,408

(22) Filed: Sep. 6, 2022

(65) Prior Publication Data

US 2023/0004621 A1    Jan. 5, 2023

Related U.S. Application Data

(63) Continuation of application No. 16/892,121, filed on Jun. 3, 2020, now Pat. No. 11,074,316, which is a continuation of application No. 16/039,270, filed on Jul. 18, 2018, now Pat. No. 10,929,496, which is a continuation-in-part of application No. 14/196,466, filed on Mar. 4, 2014, now abandoned.

(60) Provisional application No. 61/748,174, filed on Jan. 2, 2013.

(51) Int. Cl.
| | |
|---|---|
| *G06F 16/957* | (2019.01) |
| *G06F 3/0482* | (2013.01) |
| *G06F 16/23* | (2019.01) |
| *G06F 16/25* | (2019.01) |
| *G06F 16/93* | (2019.01) |
| *G06F 16/958* | (2019.01) |
| *G06Q 50/18* | (2012.01) |
| *G06Q 50/26* | (2012.01) |

(52) U.S. Cl.
CPC ........ *G06F 16/9577* (2019.01); *G06F 3/0482* (2013.01); *G06F 16/2365* (2019.01); *G06F 16/252* (2019.01); *G06F 16/93* (2019.01); *G06F 16/986* (2019.01); *G06Q 50/18* (2013.01); *G06Q 50/26* (2013.01)

(58) Field of Classification Search
CPC .... G06F 16/93; G06F 16/2365; G06F 16/252; G06F 16/9577; G06F 16/986
See application file for complete search history.

(56) References Cited

U.S. PATENT DOCUMENTS

| | | | | |
|---|---|---|---|---|
| 5,740,050 A | * | 4/1998 | Ward, II | G07F 17/24 705/13 |
| 7,603,311 B1 | * | 10/2009 | Yadav-Ranjan | G06Q 20/14 705/40 |

(Continued)

*Primary Examiner* — Vaishali Shah

(57) ABSTRACT

A system for a user to submit complying documents in response to traffic and vehicle citations wherein the user's documents are submitted via a global computerized network. The system employs a server, web application, or smart phone application to store the submitted information into a database. The system has verification means to ensure that the images, documents, and biometrics are acceptable, matches the agency database, and the information on the documents a user submits matches the information the agency has on record for the corresponding user. The system then displays a message for the user to take the next steps. The system then verifies that a user has provided payment and is able to generate emails to the users prompting them to undertake different actions and saves copies of correspondence sent to and by the user.

21 Claims, 11 Drawing Sheets

(56) References Cited

U.S. PATENT DOCUMENTS

| | | | | |
|---|---|---|---|---|
| 8,229,658 | B1* | 7/2012 | Dabell | G08G 1/0129 |
| | | | | 701/117 |
| 8,542,949 | B1* | 9/2013 | Huff | G06V 10/98 |
| | | | | 382/137 |
| 9,454,526 | B1* | 9/2016 | Kapoor | G06F 21/32 |
| 9,609,197 | B1* | 3/2017 | Stepanenko | H05K 999/99 |
| 9,779,392 | B1* | 10/2017 | Prasad | G06Q 40/02 |
| 2010/0131303 | A1* | 5/2010 | Collopy | G06Q 30/0251 |
| | | | | 340/5.82 |
| 2016/0155332 | A1* | 6/2016 | Wang | G08G 1/096741 |
| | | | | 340/932.2 |
| 2017/0084150 | A1* | 3/2017 | Keyton | G08B 21/0288 |
| 2018/0288026 | A1* | 10/2018 | Callaghan | H04L 9/3226 |

* cited by examiner

FIG 2.Technical

Flow Charts
Client's Process

FIG. 4 Technical

SYSTEM FOR VERIFYING DRIVER BIOMETRIC INFORMATION AND VEHICLE INFORMATION TO SATISFY CITATION

OTHER RELATED APPLICATIONS

The present application is a continuation of U.S. patent application Ser. No. 17/351,062, filed on Jun. 17, 2021, which is hereby incorporated by reference. U.S. patent application Ser. No. 17/351,062 is the continuation of U.S. patent application Ser. No. 14/892,121, filed on Jun. 3, 2020, which is hereby incorporated by reference. U.S. patent application Ser. No. 16/892,121 is the continuation of U.S. patent application Ser. No. 16/039,270 filed on Jul. 18, 2018 that is also incorporated by reference. U.S. patent application Ser. No. 16/039,270 is the continuation-in-part application for U.S. patent application Ser. No. 14/196,466 filed on Mar. 4, 2014, which is hereby incorporated by reference. U.S. patent application Ser. No. 14/196,466 is the parent application of provisional application 61/748,174 filed on Jan. 2, 2013 that is also incorporated by reference.

BACKGROUND OF THE INVENTION

1. Field of the Invention

The present invention relates to a system that enables a cross-browser dialog platform for the submission and verification of documentary evidence to satisfy at least one outstanding citation.

2. Description of the Related Art

Several designs for cross-browser dialog platforms have been designed in the past. None of them, however, include a system using submission and verification of documentary evidence to satisfy at least one outstanding citation or to satisfy the safety requirements of a vehicle to be operational that when verified through a Dots Per Inch Requirement using vehicle or government color placards through a network protocols for the minimum or least amount of bandwidth for clarity, a web dialog composites a new web page to enable to process. For example, to process the payment under the right category code and pay class and presenting a new web page within the dialog to be able to synchronize the database with an agency database. The agency database is associated with at least one of a state, city, county, or government jurisdiction.

3. Description of Background

Also, operating systems and their browsers like but not limited to Microsoft Windows Edge browser can require a user to download an application from their approved store. If a computing device is not updated with previous updates, the computing device can have trouble presenting a graphical user interface and its capabilities, pops ups, functions, colors, graphics, texts, etc.

Government jurisdictions have a break down in communications within their departments in synchronizing databases for requirements associated with at least one violation to satisfy the citation or the safety requirements for a vehicle.

As the automation and driver-less vehicle continue to progress. There will be a system needed to process and verify the safety requirements of a vehicle directly into the database, operating system, client program, of an automated driver less-vehicle. It will be understood that this example of a driver-less is not limited to a vehicle with the capabilities of an individual taking control of the vehicle.

Government jurisdictions have many different databases within their own departments at County, Clerks, Collections, Courts, Traffic Tickets, Police Departments, Service Locations, etc. None of them have a way to process information in constant manner with a user's computing device if but not limited to the computing device that is being used is missing updates, is no longer receiving updates from an operating system or manufacture to receive documentation required to satisfy the citation and update the current status for at least one of a driver license, registration, insurance, or proof of compliant equipment in one central place to synchronizing databases for all the government jurisdictions in a state or country.

Government jurisdictions do not have the resources or economic means to create their own systems and technologies to keep with the constant updates of computing devices. States and local governments have outdated technologies that is not able to process different types of files so users are limited which computing devices or computer programs they can use to satisfy their citation. For example, their technologies might not be compatible on a smart phone, tablet, smart watch, and near-field communications, process all image document types, accept payment from different providers, process information in their existing case management system, etc. For example, a lot of case management systems can only process and accept a PDF document or a TIFF format. A lot of case management systems require that you send executable program in a certain amount of bits to a decompiler to process information in a case management system.

Government jurisdictions within one sector may have one database for payments, a different database to store images, a different database for the Judges and courts. So, if one department wanted to sync with another, they would have to create an interface and a web dialog to wrap around another web dialog. Many government jurisdictions and agencies do not have the resources and economic means to create an interface web application, web app view, or web dialog every time a new technology emerges to satisfy requirements associated with a citation.

Laws or court decisions for a specific case/citation are constantly changing requiring different payment amounts for citations, late fees, court fees, etc. Every time there is a change in Laws or fees, government jurisdiction's departments have to get approval to implement new projects to update systems and departments. So, departments have to wait to improve efficiency.

Many government jurisdictions and agencies do not have the resources and economic means to allow new technologies an interface to connect to synchronize agency databases there limiting growth in the community with businesses, putting them at a disadvantage with other counties, not being able to collect funds efficiently, etc.

A lot of employees within a government jurisdiction use different web browsers or outdated web browsers because of budget cuts, no tech department, outdated technologies like case management systems. Employees in different departments do not have the means to update, enable, or process other department interfaces for satisfy citations in a consistent manner for communication for interfaces or deploy new technologies within existing interfaces. A lot of systems can create confusion if too many options are available for a particular citation to be satisfied. A user can click on the wrong category or allocation code creating an inappropriate dollar might to be paid or to synchronize to the wrong agency database. These scenarios can cause a lot of problems to a user not being able to use their vehicle or a government agency not being able to collect the correct fine amount or overcharging a user/customer.

Many instances happen where an individual in a court proceeding presents requirements regarding a citation or the safety of a vehicle, and a court process information but that information does not reflect in a timely manner to be paid and synchronize an agency database. Also, the opposite can happen where a court proceeding is not able to access the updated requirements submitted by a user, computing device, computing mechanism, operating system, or client program. Therefore, a court proceeding might have to be delayed or additional court fees may be applied.

It could be very expensive for government agencies to but not limited to in trying to keep up with new technologies, assigning employee roles, allocating payment codes, categories for agency databases, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a cross-browser dialog platform that supports the location and enablement of sub-contents by hosting web pages in a dialog, such that a web page may be used inside or outside a dialog to submit, verify, manipulate, and synchronize of a vehicle documentary object. According to some embodiments select elements on the hosted page may be hidden when in a dialog and invoked behavior from an input or request may be specified for hyperlinks inside or outside the dialog, and at the same time displaying the proper size of the dialog for computing device. According to some embodiments an operating system program can be executed to locate a content within a database to be displayed in the web page and dialog.

Embodiments are directed to a cross-browser dialog platform that supports hosting web pages in a dialog, such that a web page may be used inside or outside a dialog to enable interfaces to process the submission and verification of documentary evidence to satisfy at least one outstanding citation and vehicle safety requirement to post the payment under the right category code and pay class. According to some embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser Web app view platform that supports the location and enablement of sub-contents by hosting web pages in a web app view, such that a web page may be used inside or outside a web app view to submit, verify, manipulate, and synchronize of a vehicle documentary object. According to some embodiments select elements on the hosted page may be hidden when in a web app view and invoked behavior from an input or request may be specified for hyperlinks inside or outside the web app view, and at the same time displaying the proper size of the web app view for computing device. According to some embodiments an operating system program can be executed to locate a content within a database to be displayed in the web page and web app view.

Embodiments are directed to a cross-browser web app view platform that supports hosting web pages in a web app view, such that a web page may be used inside or outside a web app view to enable interfaces to process the submission and verification of documentary evidence to satisfy at least one outstanding citation and vehicle safety requirement to post the payment under the right category code and pay class. According to some embodiments select elements on the hosted page may be hidden when in a web app view and invoked behavior from an input or request may be specified for hyperlinks inside or outside the web app view, and at the same time displaying the proper size of the web app view for computing device.

Embodiments are directed to a cross-browser a web app view or dialog platform that supports a controller containing at least one memory, said memory containing an operation system. Further embodiment includes said memory containing a client program. According to some embodiments operating system and client program being a secure web browser that communicates with a microcontroller or microprocessor hosted within web app view or dialog. The memory stores authentication information including but not limited to password, encrypted key, certificate, endpoint information in controller or database. According to some embodiments a controller having the ability to send instruction to secure web browser to terminate session when time stamps generated by encryption program is outside of a predetermined time frame. Also, to continuously verify a user included but not limited to time stamps. Secure web browser being includes but not limited to an exe file, script within browser, javascript, html, css, c++, java, etc.

Embodiments are directed to a cross-browser a web app view or a dialog platform that supports a secure web browser that communicates with a vehicle documentary object and synchronize an agency database or government jurisdiction. Agency database and Government Jurisdiction database include but not limited to a city and state.

Embodiments are directed to a cross-browser a web app view or a dialog platform that supports checking the Dots Per Inch (DPI) for clarity for the requirement for an image to synchronize a database. The checking of the clarity includes but not limited to running a program of a hosted web page or program in the web app view or dialog sub-contents. The checking of the clarity includes but not limited using the sensors on a device. The sensors include but not limited to accelerometer, gyroscope, magnetometer, and GPS. The checking of the clarity includes but not limited the user holding the vehicle documentary object in different behavior positions to capture holograms, seals, certificates, branding information that makes the vehicle documentary valid with a government jurisdiction. For example, the web application may require the user to hold the vehicle documentary in a certain angle and using the sensors of a device to confirm angle and lighting. Angles can include but not limited to 90 degrees, compass direction, measuring distance from device and document. Lighting includes but not limited using the property record of a property to review the architecture of structure to guide the person in terms of square feet to the appropriate window, light fixture, bedroom light, kitchen light, etc. at a certain time of the day. To guide the customer, the web application can run a camera sensor function, exe, Java, JavaScript, html, script from browser, html, xml, css, json schema, xml schema. Running a program hosted on the web page to be able to check for clarity can include but not limited to a program within or a third party.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object. At the same time displaying the appropriate graphical user interface to an authorized user. For example, if the vehicle documentary is related to Driver License display in the sub-contents programs to check holograms, DPI, valid with a state, city, or government jurisdiction database. For example, if the vehicle documentary is related to insurance and tag/registration, there may be no need to display sub-contents to check holograms. For example, if the vehicle documentary is related to improper equipment, there may be no need to display an affidavit or document similar to an affidavit, generate a notarization program or link. Each GUI can be predetermined which government jurisdiction data base to be synchronized with or determined by an authorized user. By displaying the appropriate GUI for authorized user, reduces the risk of error, allocating the incorrect pay class and category for a system or case management system.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object. At the same time displaying the appropriate graphical user interface to an authorized user. The GUI can allow one authorized user or multiple users at one time. The GUI can inform the users who is currently viewing and editing information. There can be permissions set for each authorized user.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to near-field communication, biometrics, and Bluetooth. NFC allows an authorized user, for example a police officer to submit and verify vehicle documentary object for safety or to satisfy requirements for a citation on the road, office, or a particular location. Using these types of connection to instruct a user to use web application and authorizing police officer to use platform.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited using an operating system program or client program inside a vehicle to transmit performance safety scan and transmitting that information directly to platform when a web application is opened using a device within a vehicle or a device associated with that vehicle by a user. The device includes but not limited to a computing device. The user's device may or may not be associated with vehicle. If user device not associated includes but not limited by a means for authorizing can be generated by user of that vehicle, push notifications, biometrics, NFC, Bluetooth, etc.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to a host data replicator to copy relational data between the mainframe and the SQL, Lin server database. It could also be used to create a secure VPN connection. Includes but not limited to unixODBC Project, setting up a Linux or UNIX environment, display database command, OB2 databases, table spaces, XML table spaces, LOB table spaces, Index spaces within a database, Indexes on auxiliary tables, Partitions of partitioned table spaces, Partitions of index spaces.

All Embodiments: According to some Embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to satisfy the requirements for a citation.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to satisfy the requirements of a driverless vehicle.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes: defining the separate behaviors based on one of: a markup language attribute for each link and a parameter on each link's query string. on page load of the web page, iterating through anchor tags on the web page to determine links with a relevant one of a markup language attribute and a query string key; and modifying one of the markup language attributes and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or ouside a dialog or web dialog to specifying separate behaviors for the links includes: defining the separate behaviors based on one of: a Dots Per Inch attribute for each link and document object model parameter on each link's query string. on page load of the web page, iterating through anchor tags on the web page to determine links with a relevant one of a markup language attribute and a query string key; and modifying one of the markup language attributes and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes and to serve the composite of a new web page based on vehicle object with activation based on color placards through assessing visual acuity using a video image of a optotype chart obtained with the standard focal length and aperture of computing device and compare the remote images transmitted using various bandwidths and connection protocols.

The invention is a system and method for measuring visual acuity. The system comprises a computer or a projector adapted to project a computer-generated image of an optotype on a surface, e.g., a computer display screen or a screen on a wall at any custom distance, fixed distance, or an automated distance.

The projector comprises a zoom lens that enables continuous digital or optical zoom in the range of 20× or standard, or non-standard. The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g., numerals, images, emojis, or letters in any language or symbols. However, since the Hindu-Arabic numerals (0, I, 2, 3, 4, 5, 6, 7, 8, 9) are familiar to almost every person in the world as evidenced by their appearance on the bank notes of most countries, their use as optotypes are suggested.

The computing device comprises a zoom lens that enables continuous digital or optical zoom in the range of 20× or standard. Includes but not limited to: standard or non-standard focal length and aperture of computing device; The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g., numerals, images, emojis, or letters in any language or symbols. However, since the Hindu-Arabic numerals (0, 1, 2, 3, 4, 5, 6, 7, 8, 9) are familiar to almost every person in the world as evidenced by their appearance on the bank notes of most countries, their use as optotypes are suggested.

It is also noted that the optotypes can also be displayed to the client using a computer and computer, television, or similar display screen as long as the computer is programmed to continuously vary the size of the optotype at a known rate and not to display a series of optotypes with different sizes in a "staircase" manner or limited manner.

Generally, program modules include routines, programs, components, data structures, and other types of structures that perform a particular task or implement a particular abstract data type. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding A computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform", "Composite", "Look and Feel" may be a combination of software and hardware components for managing computer and network operations, which may provide web applications with hosted web pages and dialog interactions. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

While the embodiments will be described in the general context of program modules, color placards, bandwidth protocols, vehicle safety standards, vehicle citation compliance documents or documents, that execute in conjunction with an application program that runs on an operating system on a personal computer, those skilled in the art will recognize that aspects may also be implemented in combination with other program modules.

The placards or placards included but not limited to government traffic signs, posters, graphics, computer graphics, non-government generated placards instead private companies placards placed on vehicles, signs, posters, computing devices, etc. Placards can be in the standard colors for hazards blue, yellow, green, and red, or can be in custom colors, or automated generated colors based on a user experience, website, application, and computing device. Placard images can be used with the lighting of a property layout or without a property layout directed by computing device to take a picture of an object by asking a user to first take a picture of an image inside or outside property and use the lighting to compare images for transmission protocols instead of images stored remotely, local, or cloud. Then, update data store, database, server with images taken by a user to compare and serve composite web site, dialog, web app view, web application, application.

All Embodiments: According to some embodiments can be generally understood with the scope of the invention without placing limitations thereon.

All Embodiments: According to some Embodiments includes but not limited to all embodiments described.

All Embodiments: According to some Embodiments include but not limited to activating a link and serving a composite look and feel description of a data store based on the vehicle citation and safety documentation object associated with the least bandwidth possible while retaining clarity through color placards, assessing visual acuity using a video image of a optotype chart with focal length and aperture.

All Embodiments: According to some Embodiments of objects of the invention will be brought out from the following detailed description and a review of the associated drawings. It is for the purpose of fully disclosing the invention without placing limitations thereon.

All Embodiments: According to some Embodiments include but not limited to a server for providing a web application executing a script within a cross-browser web dialog platform.

All Embodiments: According to some Embodiments include but not limited to java, javascript, script within browser, executable program, operating system program, secure web browser, css, json schema, xml schema, object-oriented model, PHP, a document analysis and optical character recognition (OCR) system, and document object-oriented model.

Further objects of the invention will be brought out from the following detailed description and a review of the associated drawings. It is for the purpose of fully disclosing the invention without placing limitations thereon.

All Embodiments: According to all or some embodiments included to but not limited to all of this document, description, claims, summary, drawings, detailed description thereon.

All Embodiments or According to some embodiments having instructions to terminate or turn off automatically a serve a composite web page activation if clarity, placards, protocols, or vehicle object is not obtained includes but not limited to an executable program, encryption program, secure web browser, script within browser, script within dialog, or script within new web page, from a hosted web page, contents, or sub-contents inside dialog, web app view, web site, and web application.

All Embodiments or According to some embodiments having instructions to continue automatically to serve a composite web page activation if clarity, placards, protocols, or vehicle object, is not obtained includes but not limited to a executable program, encryption program, secure web browser, script within browser, script within dialog, or script within new web page, from a hosted web page, contents, or sub-contents inside dialog, web app view, web site, and web application.

All embodiments or According to some embodiments of allowing the continuation to serve a composite website or activation or termination of a composite website, dialog, web app view, web application, can have the capabilities to receive placards from a certain time designed by web application, web app view, or dialog or by a third party that has an API, Web Service, or non-related to government.

All embodiments or According to some embodiments of allowing the continuation to serve a composite website, activation, or termination in a script within browser, web application, dialog, web app view, smart phone app, near-field communication, Bluetooth in low light or high light connection, QR-codes, biometrics.

All embodiments or According to some embodiments of allowing the continuation to serve a composite website, activation, or termination can be a dialog, web application, smart phone application, web app view, near-field communication, Bluetooth in low light or high light connection, QR-codes, biometrics, text messaging.

All embodiments or According to some embodiments for network protocols include but not limited to: transparently providing the application with the—simultaneous use of multiple channels by multiplexing data from the application across a set of available channels by exposing a link layer through activation of DPI, dialog, user profile, vehicle object. Multiplexing Transport Protocol, Bandwidth Application Protocol, 33.6 Kbps POTS (IP), 128 Kbps ISDN, 384 Kbps ISDN, 10 Mbps LAN (IP).

All embodiments or According to some embodiments having an program to includes but not limited to instruct a user to go to the closer network router, reduce interface by other appliances, secure better connection find the best routing channel, in their location by using, Secure Web Browser, GPS, Cell Towers, the layout of one's property, configured in the user's profile or automatically. Also, instructions regarding the measurement of lighting.

All embodiments or According to some embodiments having an program to includes but not limited to a computer generated image of an optotype on a in any order of dialog, web app view, web application, application, on a separate computing device, on computing device, and on a microcontroller.

All embodiments or According to some embodiments includes but not limited to: website, dialog, web app view, web application, application, smart phone application in any order.

All embodiments or According to some embodiments includes but not limited to placards can be images on vehicles taken by a user, third party, separate entity computing device or any other device that allows to capture images.

All embodiments or According to some embodiments includes but not limited to placards being magnets on vehicles and objects. Also, using the images from an authentication captcha program or interface.

The required documents can also be uploaded can by scanning bar codes, QR codes, any type of codes that are placed/embedded on the required documents for compliance.

The entire invention can be independent from a county/city/state system or can be networked/connected to a county/city/state system with a web service or any other technological service.

User can use their computer, smart phone, or tablet computer; via the internet; to go to web application; and upload compliance documentation; Uploaded and entered information and compliance documentation is transmitted through networked communication system to be approved by a qualified person, automated system or a clerk county/state employee; Uploaded information and compliance documentation is validated with states or county's highway and motor vehicle data base; User can upload compliance documentation from their documents saved on computer, tablet computer, email, other web applications, other phone applications, Near field communication (NFC), web camera on computer, smart phone camera, tablet camera etc.

User can download a smart phone application; smart phone application is connected/networked to state's or county's database to allow user to search for their citation; and upload compliance documentation; User can use camera on their smart phone to upload compliance documentation; User can upload compliance documentation from their documents saved on computer, tablet computer, email, other web applications, other smart phone applications, Near field communication (NFC), etc; Uploaded and entered information and compliance documentation is transmitted through networked communication system to be approved by a qualified person, automated system or a clerk county/state employee.

Additional aspects of the invention will be set forth in part in the description which follows, and in part will be obvious from the description, or may be learned by practice of the invention. The aspects of the invention will be realized and attained by means of the elements and combinations particularly pointed out in the summary of the invention.

Web application has an interface to upload compliance documents from user's documents saved on computer, tablet computer saved documents, email, other web applications, other smartphone applications, Near field communication (NFC);etc; Web application interface has the capabilities to accept payment or direct user to make payment at state's or county's system;

Uploaded and entered information and compliance documentation is transmitted through networked communication system to be approved by a qualified person, automated system or a clerk county/state employee.

Additional aspects of the invention will be set forth in part in the description which follows, and in part will be obvious from the description, or may be learned by practice of the invention. The aspects of the invention will be realized and attained by means of the elements and combinations particularly pointed out in the summary of the invention.

DETAILED DESCRIPTION

Figure 1:
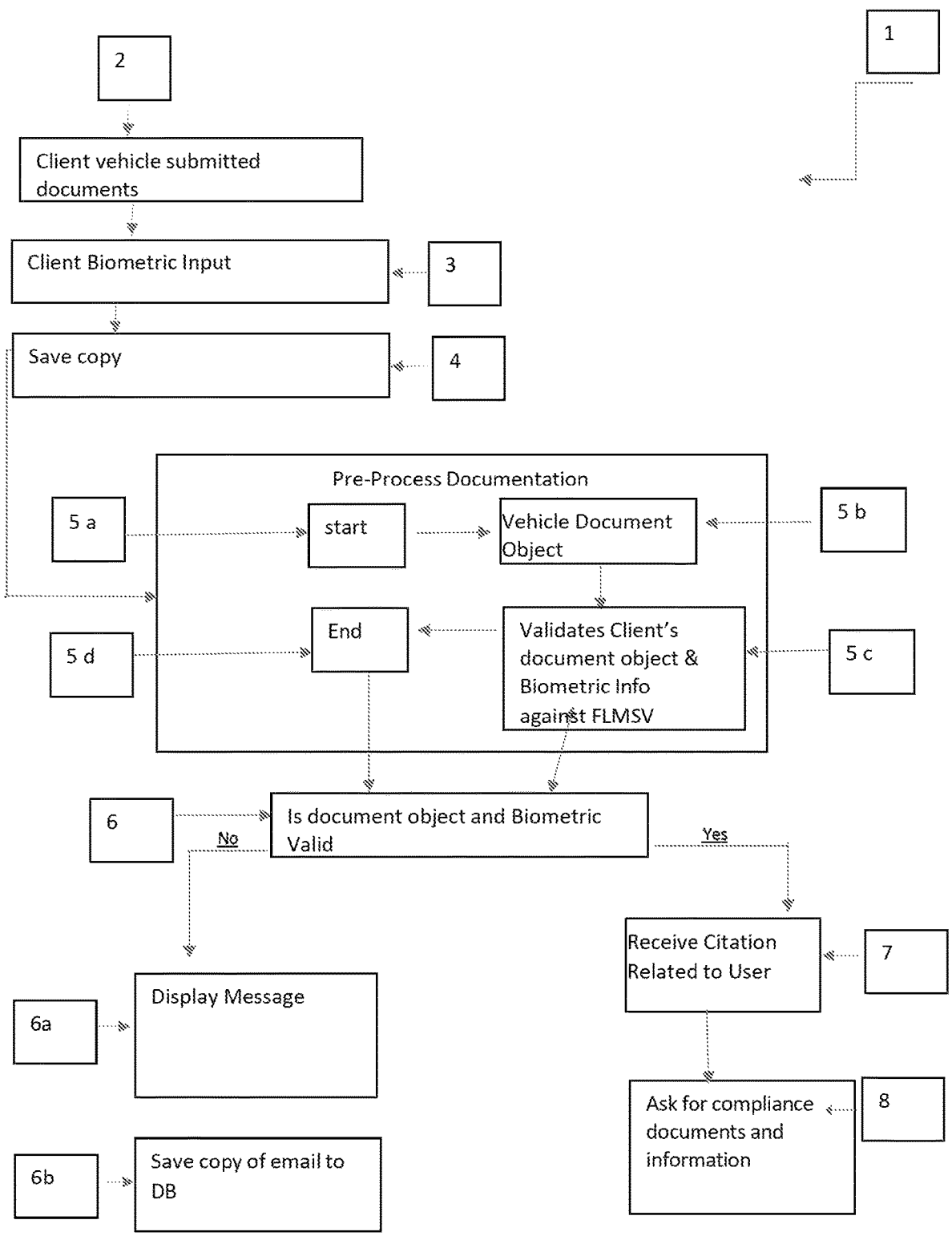
FIG. 1 represents a block diagram illustrating the collection of vehicle documents and biometrics related to a user to verify a valid status with a government jurisdiction.
Figure 2:
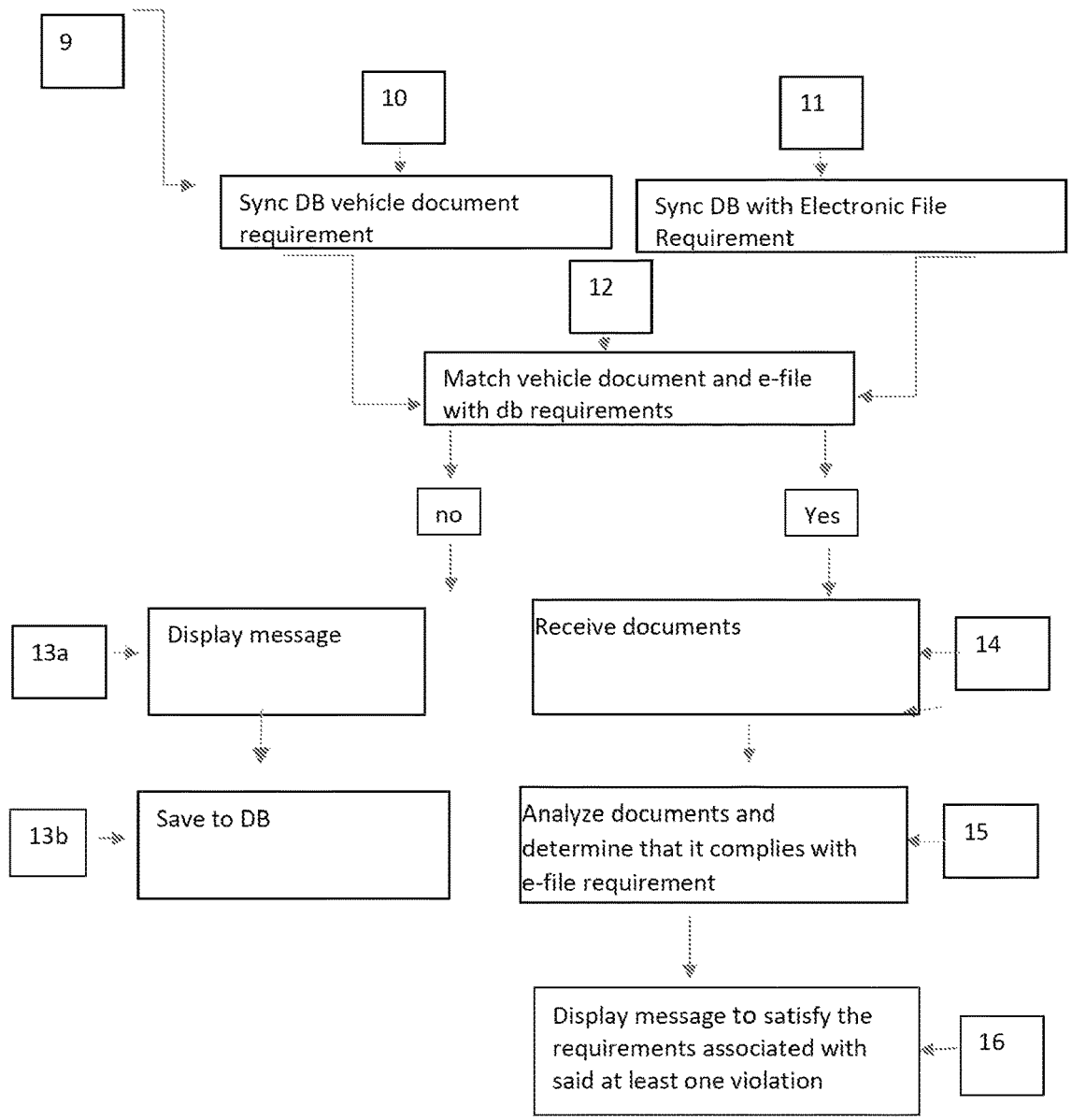
FIG. 2 outlines an example of an optional circumstance that a databases updates vehicle documentary object requirement for submitted documentation to match a vehicle documentary object requirement for submitted documentation in the agency assessing an electronic file requirement.
Figure 3:
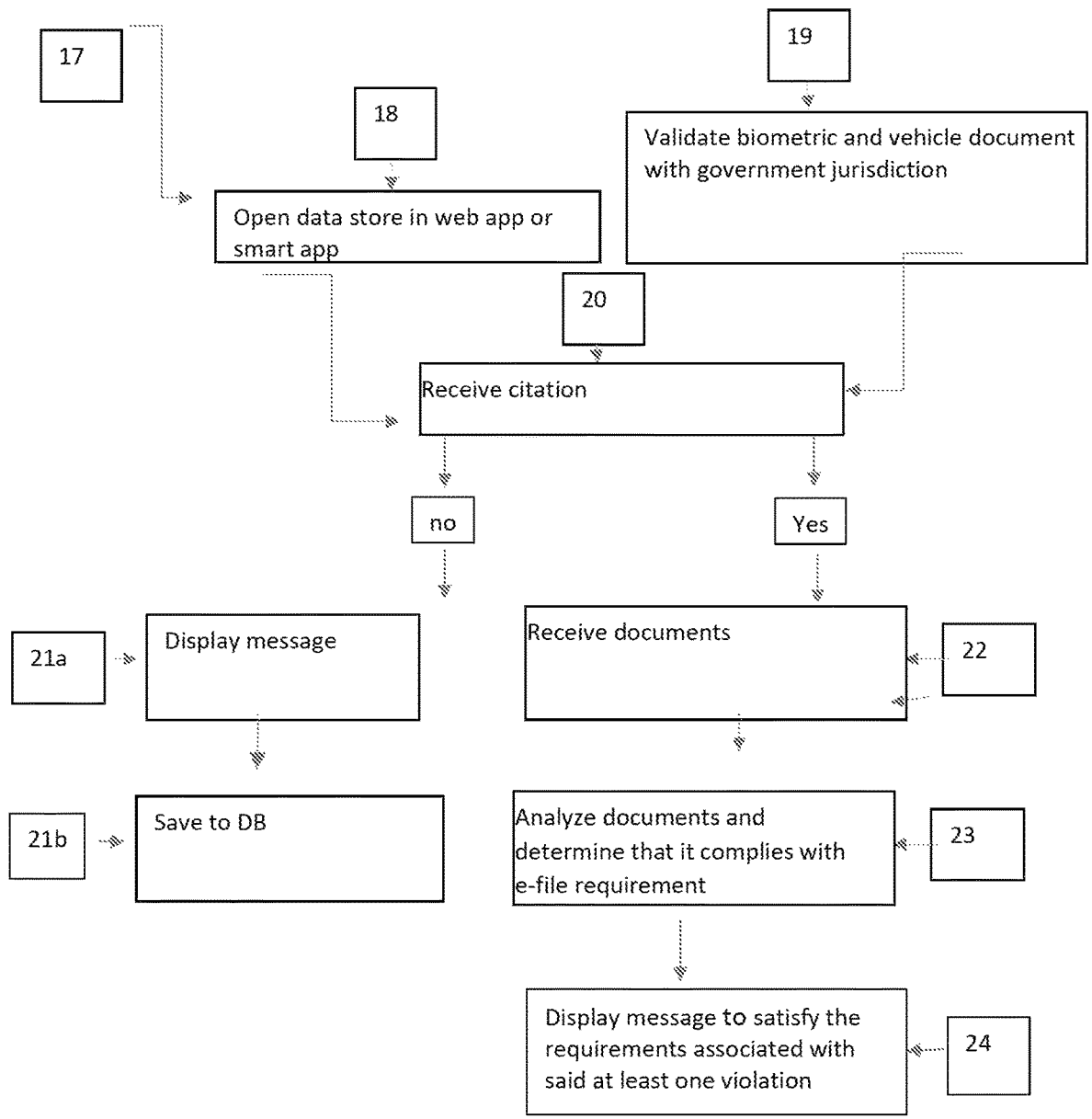
FIG. 3 shows a block diagram representing an embodiment where the user stores information on their web application or smart phone to begin the process of satisfying at least one violation of a citation.
Figure 4:
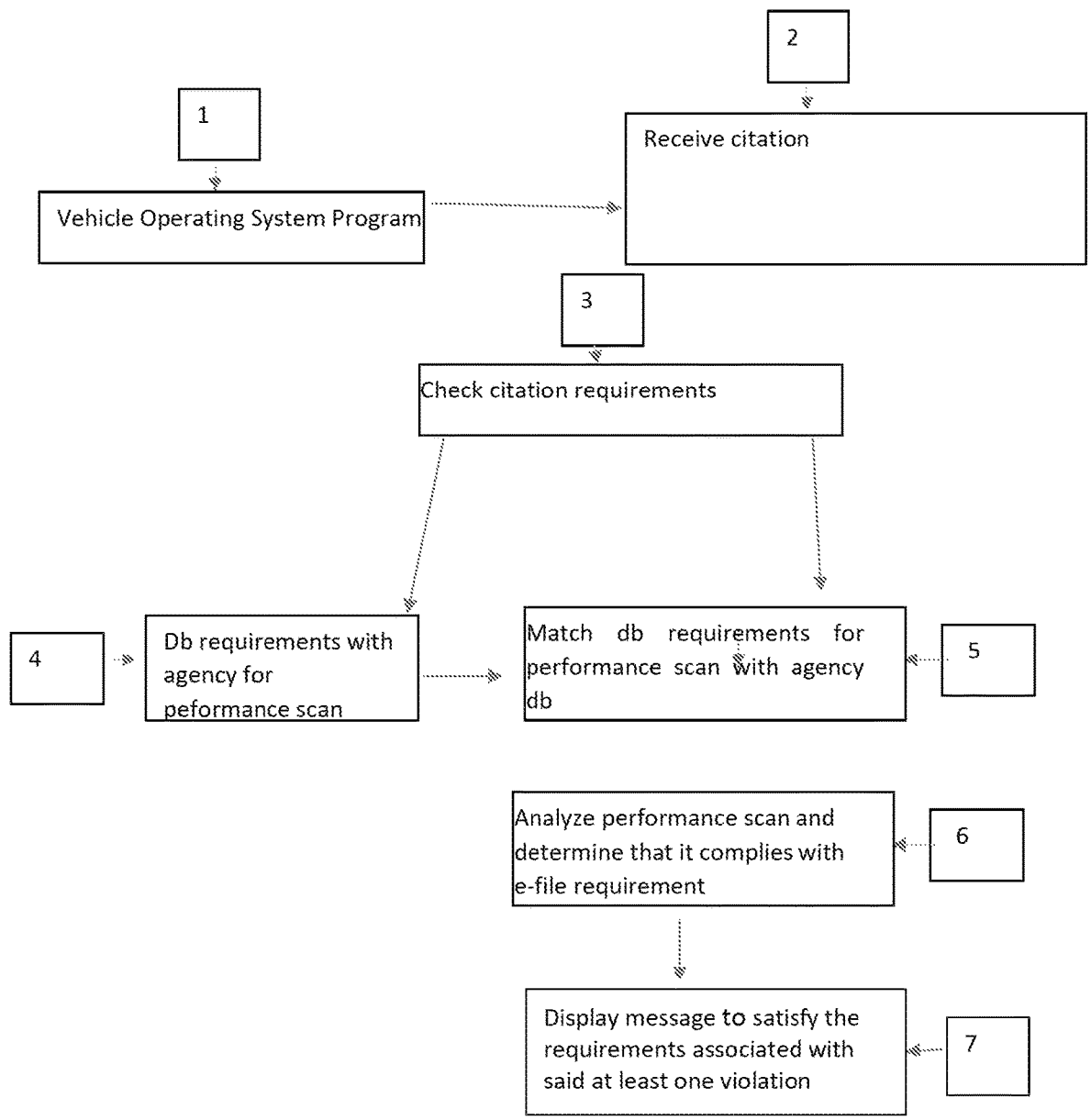
FIG. 4 represents a block diagram illustrating the collection of vehicle documents using an operating system program inside a vehicle.
Figure 5:
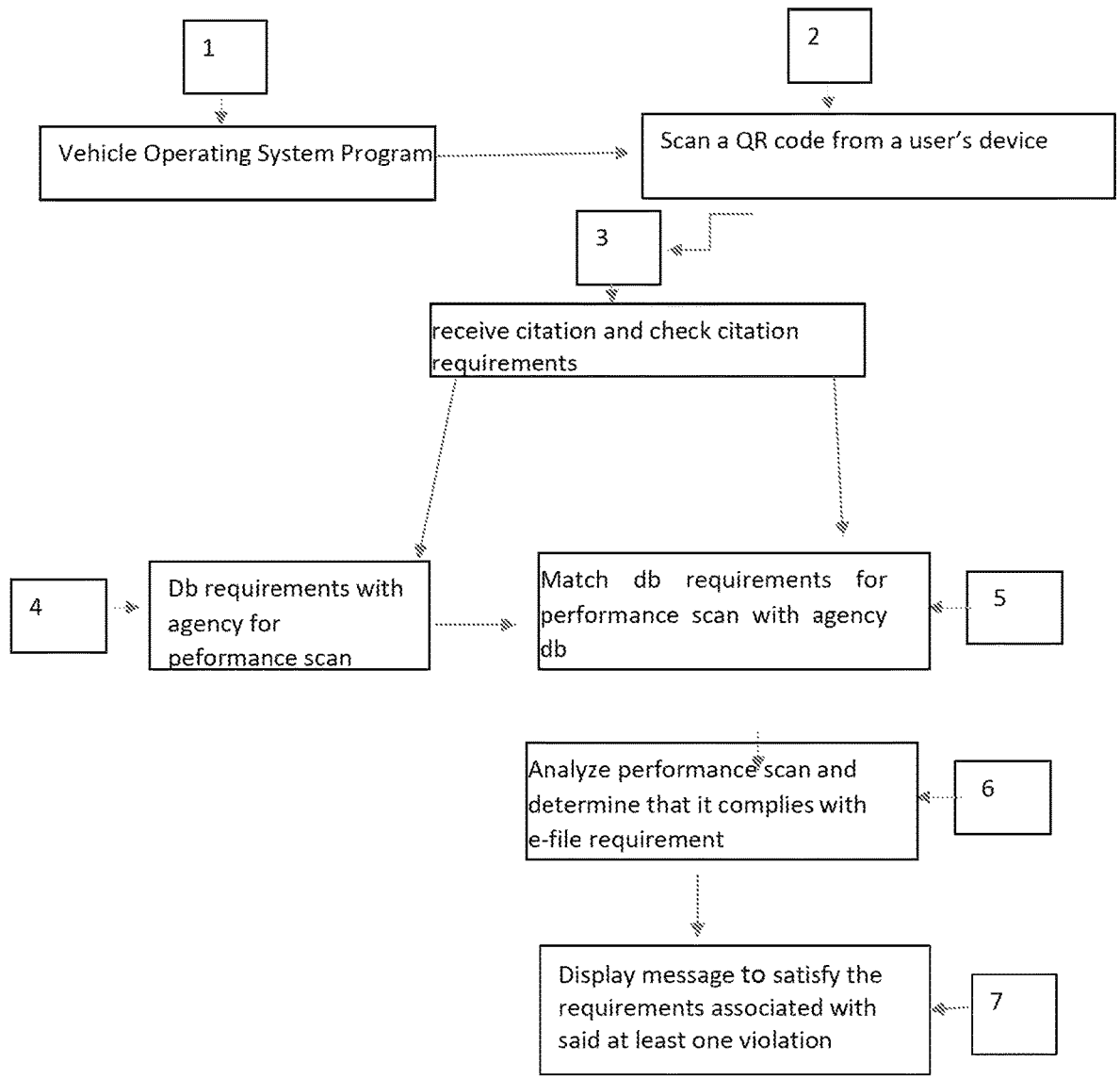
FIG. 5 represents a block diagram illustrating scanning a QR code from a user's device to begin satisfying at least one violation of a citation with a user's device.
Figure 6:
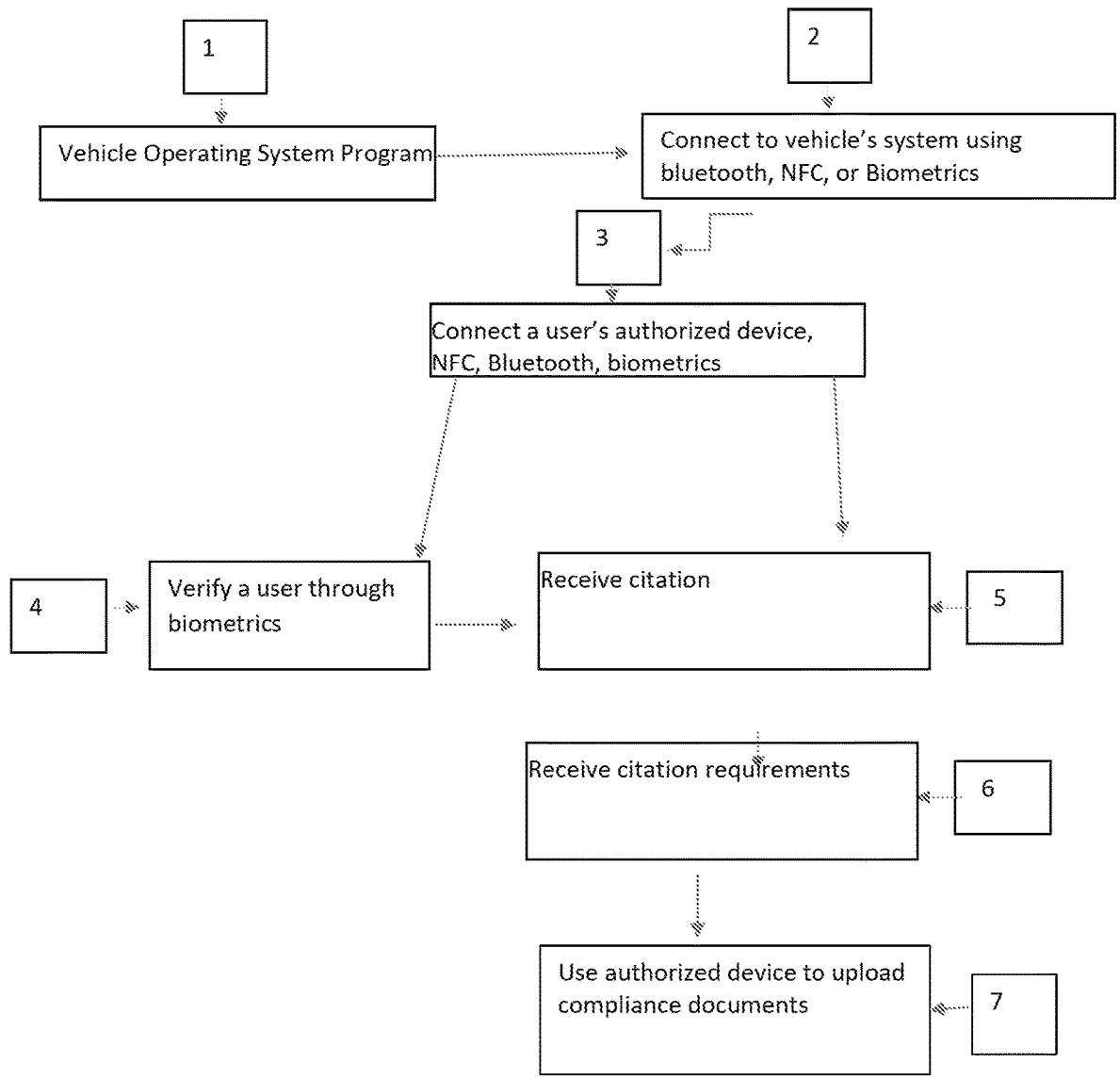
FIG. 6 shows a block diagram representing an embodiment where a user connects to a vehicle's operating system to begin satisfying at least one violation of a citation a user's device.
Figure 7:
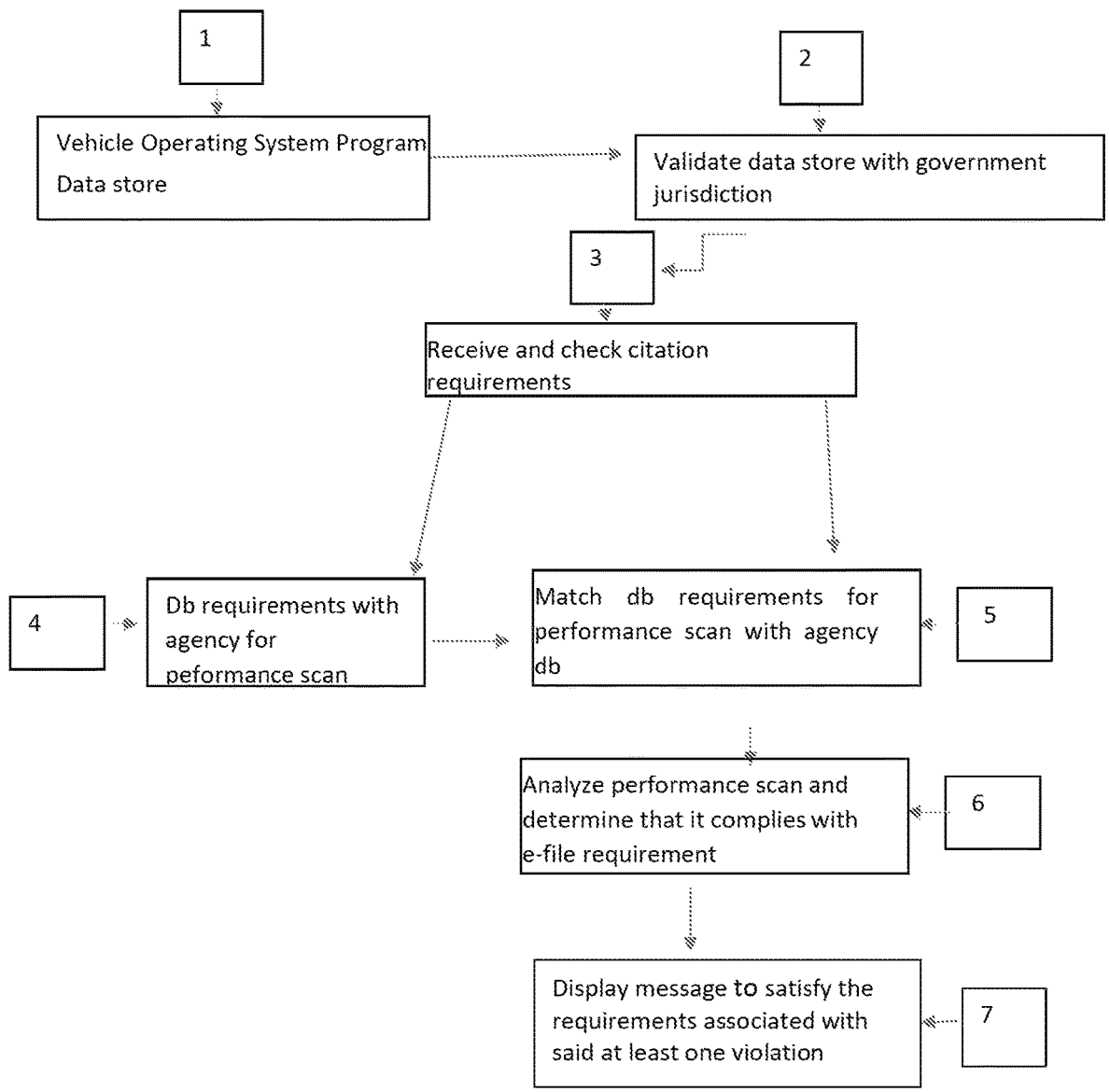
FIG. 7 shows a block diagram representing an embodiment where the user stores information on vehicle system program to begin the process of satisfying at least one violation of a citation.
Figure 8:
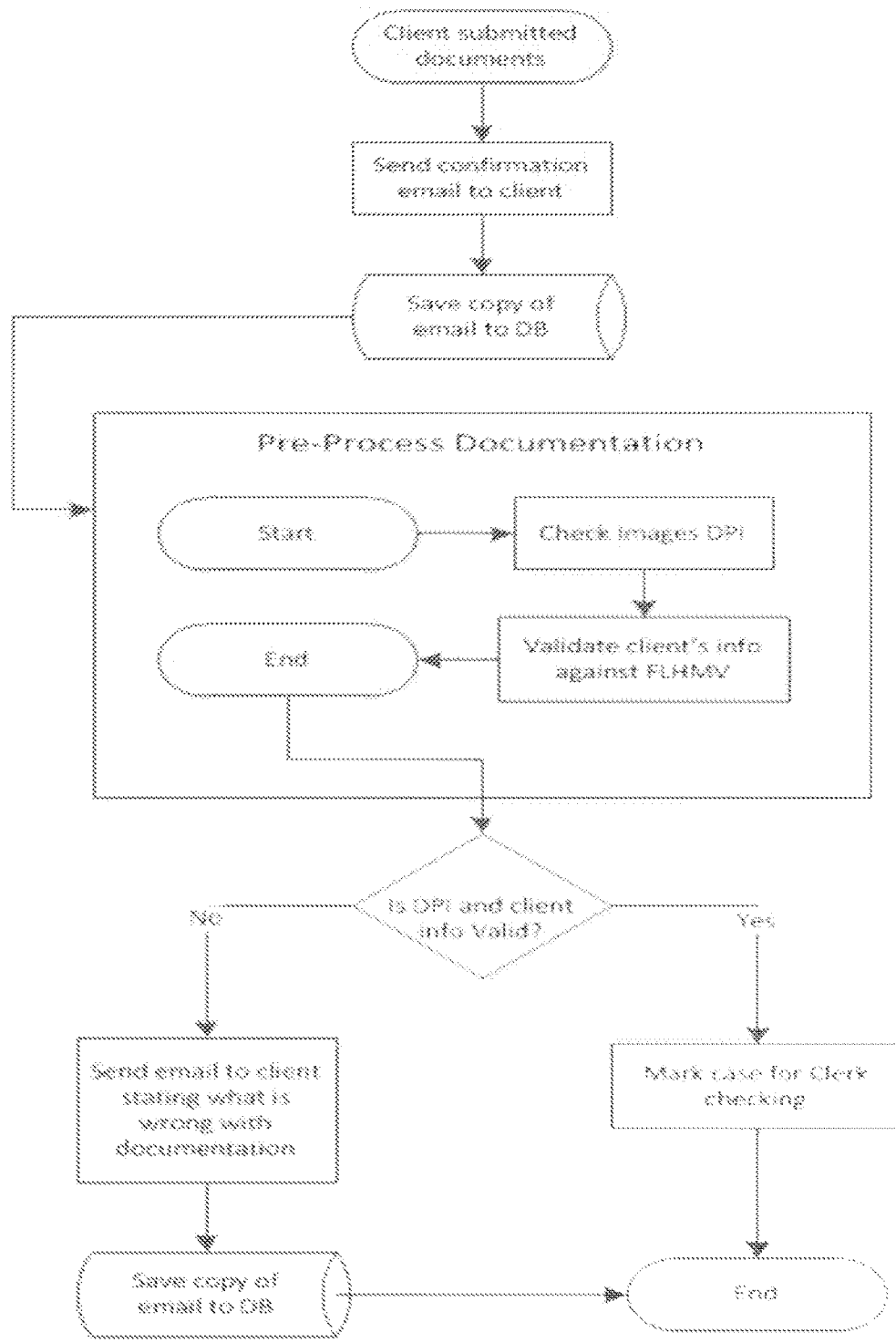
FIG. 8 User's compliance documents are submitted; save copy on database; Check images for DPI; validate user's entered information and documentation with state/city/county database; any wrong documentation; user receives email to resolve.
Figures 1, 9:
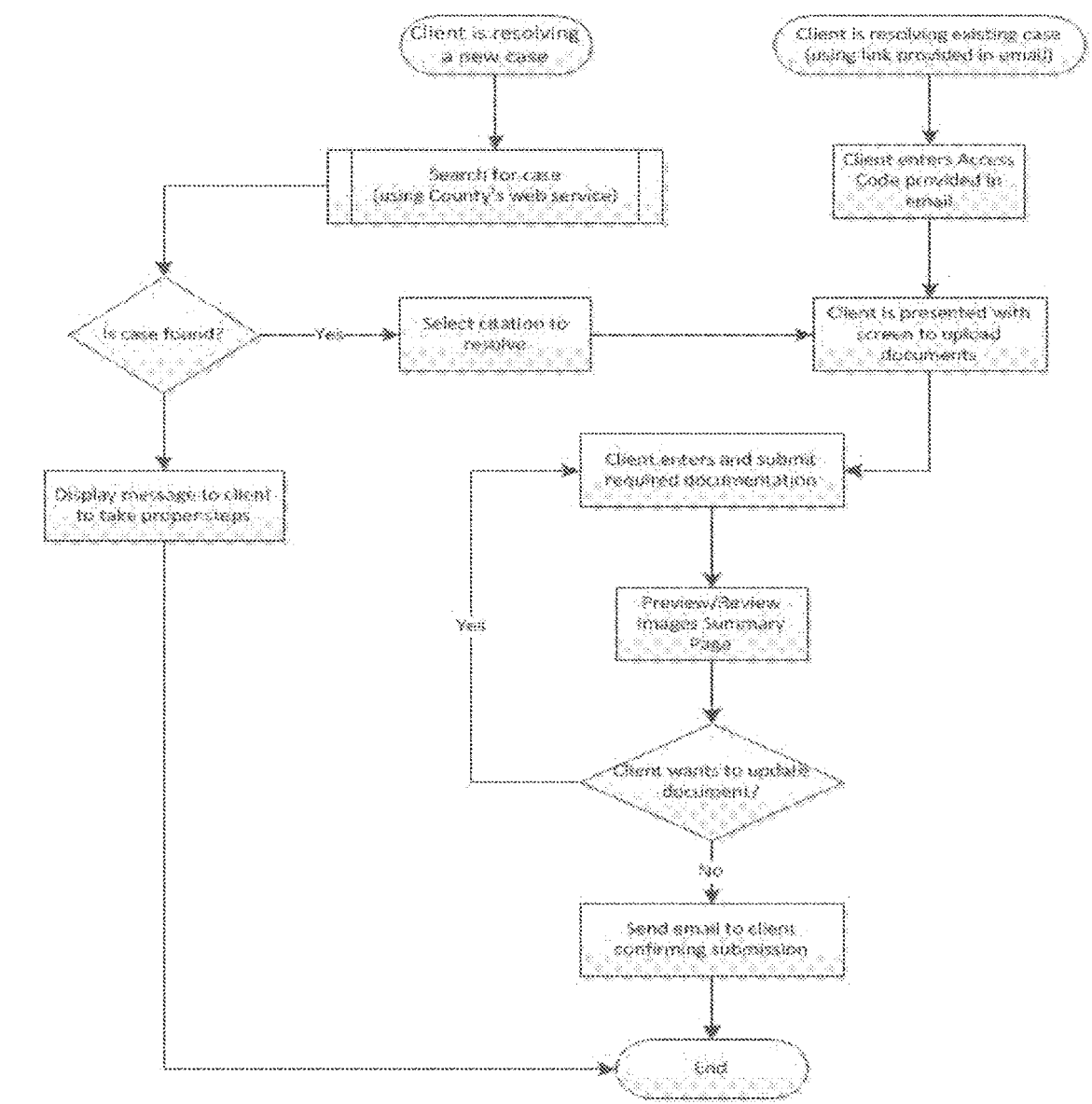
FIG. 9 is a diagram illustrating if User is resolving a new or an existing case. User searches for their case or enters access code to complete an existing case. User uploads compliance documents.
Figure 10:
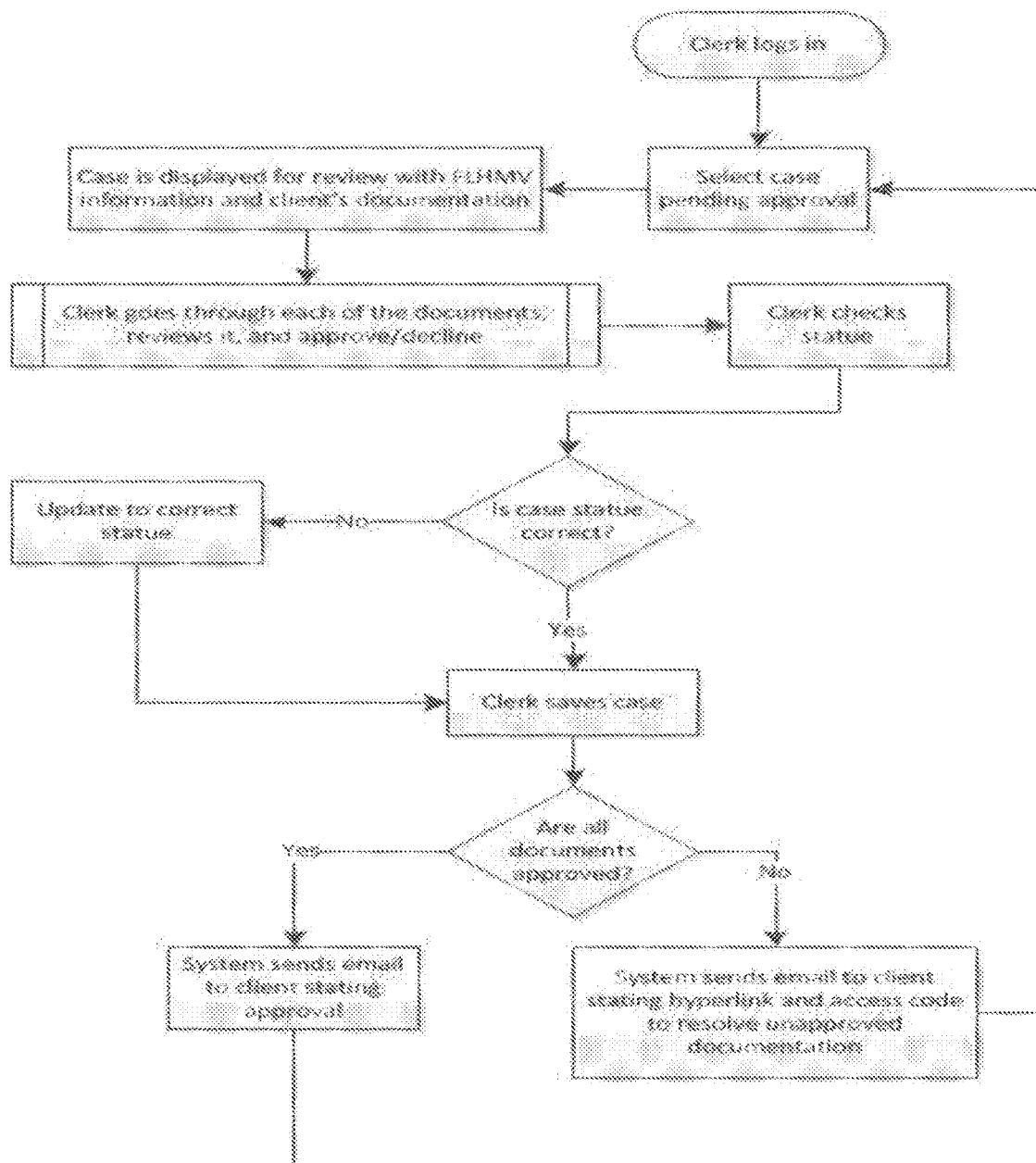
FIG. 10 Clerk/Employee/Professional reviews submitted information; Then, approves or denies; verifies correct case payment amount; if all documents are approved. send email/message to user with link for payment.
Figure 11:
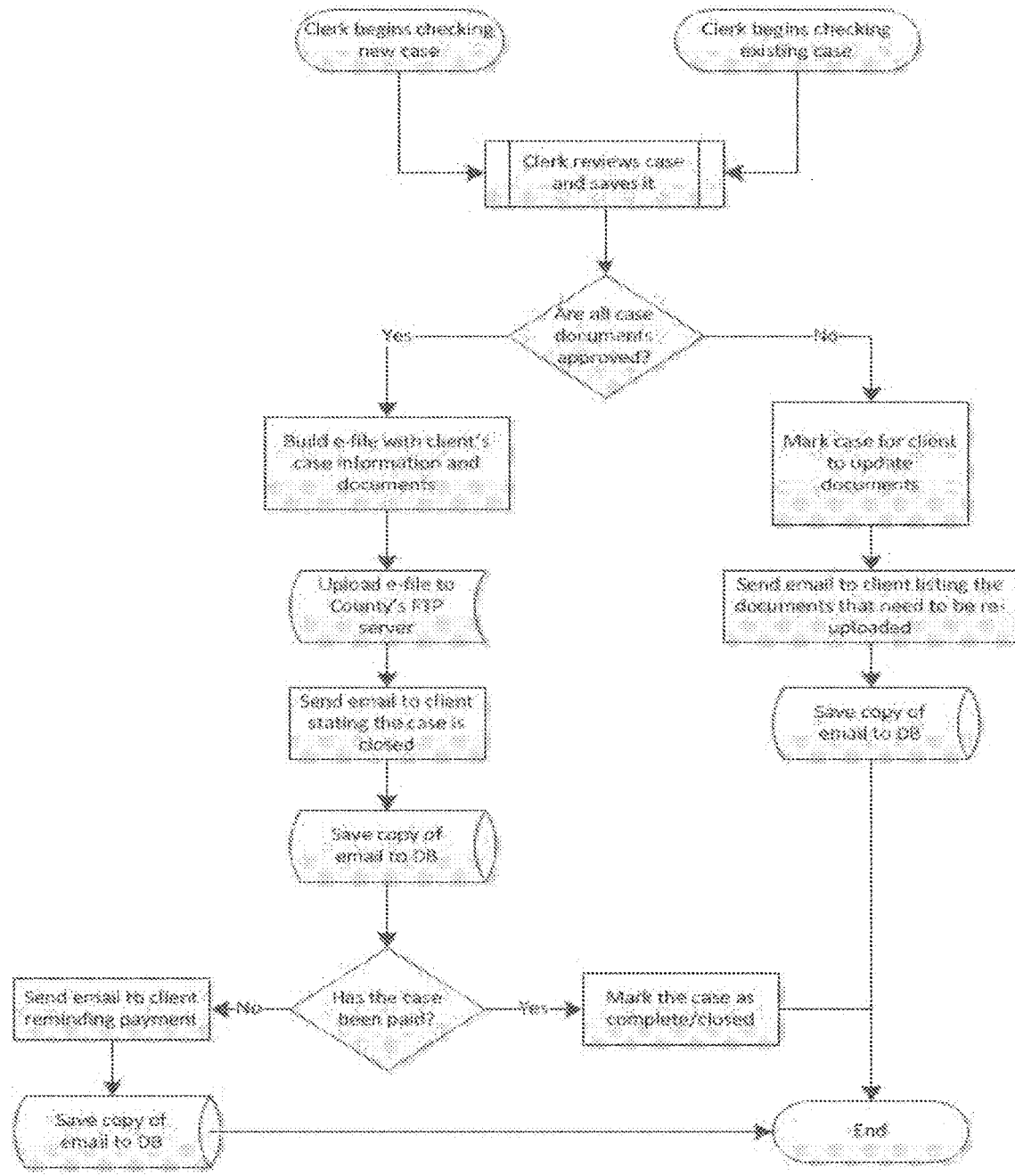
FIG. 11 All case documents are approved; uploaded to e-file; to County's/State's/City's FTP Server.

As briefly described above, web pages may be hosted with the contents of a vehicle documentary object with a dialog or a web app view hiding select elements of the hosted web page when in a dialog, implementing different behaviors for contents and hyperlinks inside or outside a dialog or a web app view, and inferring a size of a dialog or a web app view from its contents. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As described above, a cross-browser dialog platform that supports the location and enablement of sub-contents by hosting web pages in a dialog or web app view, such that a web page may be used inside or outside a dialog or web dialog to specifying separate behaviors for the links includes and to serve the composite of a new web page based on vehicle object with activation based on color placards through assessing visual acuity using a video image of a optotype chart obtained with the standard focal length and aperture of computing device and compare the remote images transmitted using various bandwidths and connection protocols.

What is claimed is:

1. For a computing device comprising at least one processor and memory that contains instructions that are readable by the processor and cause the computing device to serve a proper step message display on a screen according to a submission compliance validation for an other submission compliance to serve the proper step message display;

for the other submission compliance to serve the proper step message display to satisfy requirements associated with said at least one violation;

wherein said validate a submission compliance includes a communication address of the user, a correct statue from a dots per inch requirement (DPI), at least one violation, and the data from the documentation to be transmitted; wherein said documentation is at least one of a driver's license, registration, insurance, or proof of defective equipment;

wherein said the other submission compliance to serve the proper step message display on the screen of the device includes a compliant transmission for a requirement associated with said at least one violation and update a current status of the citation;

receive, a citation related to a user, wherein application on said device operably configured to serve the proper step message display on the screen for the other submission compliance by accessing at least one violation associated with the citation, and the current status of the citation;

receive documentation required to satisfy the citation and update the current status;

applying a DPI technological service to analyze the documentation in response to determine that the DPI according to a pre-process documentation;

wherein said pre-process documentation to compare the DPI of the documentation to the DPI requirement;

determine the documentation complies with the DPI requirement, update the current status, and serve the proper step message display on the screen of the device to transmit said compliant DPI requirement to the other submission compliance;

wherein said transmit to the other submission compliant includes to serve the proper step message display on the screen of the device to serve the proper step message display for the other submission compliance;

determine said transmit complies, said proper step message display to serve the presentable proper step message display on the screen for the other submission compliance with the capabilities to take the proper steps to satisfy the requirements associated with said at least one violation.

2. The method set forth in claim 1 said proper step message display to serve the presentable proper step message display on the screen for the other submission compliance includes the presentable proper step message display on the screen of the device with the capabilities to take proper steps from the proper step message display; the presentable proper step message display on the screen of the device further comprising to build electronic file, to accept payment, to direct a user to make payment, to close the case, to close the case and upload to a server, or mark the case for review.

3. The method set forth in claim 1 said proper step message display to serve the presentable proper step message display on the screen for the other submission compliance includes a smart phone application; the other submission compliance smart phone application further comprising serving a proper step display message on the screen of the device for uploading documents, a scanning of bar codes, QR codes, or any type of codes that are placed/embedded on the documentation; the other submission compliance scan or upload serving a presentable proper step message display on the screen of the device to transmit compliant information; Said presentable proper step message display on the screen of the device with the capabilities to take proper steps from the proper step message display and transmit compliant information to the submission compliance device; the submission compliance device further comprising a smart phone application.

4. The method set forth in claim 1 determine the documentation complies with the DPI requirement includes the other submission compliance serving a proper step display message on the screen of the device for uploading documents, a scanning of bar codes, QR codes, or any type of codes that are placed/embedded on the documentation; the other submission compliance scan or upload further comprising a validation with a highway safety motor vehicle database, Said highway safety motor vehicle validation serving a presentable proper step message display on the screen of the device to transmit compliant information; wherein said transmit compliant information to serve a proper step message display for the submission compliance device screen; the proper step message display to check and update a correct statue from any technological service that is networked or connected to the smart phone application; wherein said any technological service to serve a proper step message display on the screen of the device to build electronic file, to accept payment, to direct a user to make payment, to close the case, to close the case and upload to a server, or mark the case for review.

5. The method set forth in claim 1 wherein the proper step message display to serve the presentable proper step message display on the screen for the other submission compliance includes the other submission compliance serving the proper step message display on the screen of the device and serving the presentable proper step message display on the screen of the other submission compliance or the submission compliance validation.

6. The method set forth in claim 1 wherein the proper step message display to serve the presentable proper step message display on the screen for the other submission compliance includes the other submission compliance serving the proper step message display on the screen of the device and serving the presentable proper step message display on the screen further comprising said scan, transmit, upload, validation, any other technological service, compliant information, the dots per inch requirement, network, connection, interface, web service, web application, email, hyperlink, access code, correct statue, update correct statue, or resolve unapproved documentation.

7. The method set forth in claim 1 wherein the proper step message display to serve the presentable proper step message display on the screen for the other submission compliance includes the submission compliance serving the proper step message display on the screen of the device and the other submission compliance serving the presentable proper step message display on the screen further comprising said scan, transmit, upload, validation, any other technological service, compliant information, the dots per inch requirement, network, connection, interface, web service, web application, email, hyperlink, access code, correct statue, update correct statue, near-field communication (NFC) or resolve unapproved documentation.

8. The method set forth in claim 1 wherein the proper step message display to serve the presentable proper step message display on the screen for the other submission compliance includes the submission compliance serving the proper step message display on the screen of the device and the other submission compliance serving the presentable proper step message display on the screen further comprising said proper step message display on the screen of the device or said presentable proper step message display on the screen of the device with the capabilities to take the proper step or steps to build electronic file, to accept payment, to direct a user to make payment, to close the case, to close the case and upload to a server, or mark the case for review.

9. The method set forth in claim 1 wherein the proper step message display to serve the presentable proper step message display on the screen for the other submission compliance includes the other submission compliance serving the proper step message display on the screen of the device and the other submission compliance serving the presentable proper step message display on the screen further comprising the proper step message display on the screen to validate the dots per inch requirement, validate the required documentation and information with a highway safety motor vehicle database, validate entered information, validate an access code, validate a hyperlink, or validate an email.

10. The method set forth in claim 1 wherein the proper step message display to serve the presentable proper step message display on the screen for the other submission compliance includes the other submission compliance serving the proper step message display on the screen of the device and the other submission compliance serving the presentable proper step message display on the screen further comprising the other submission compliance serving the presentable proper step message display on the screen of the submission compliance device application with the capabilities to take the proper step or steps.

11. The method set forth in claim 1 wherein the proper step message display to serve the presentable proper step message display on the screen for the other submission compliance includes the other submission compliance serving the proper step message display on the screen of the device and the other submission compliance serving the presentable proper step message display on the screen further comprising smart phone application, web application, near-field communication (NFC), web service, any other technological service, or automated service.

12. The method set forth in claim 1 wherein the proper step message display to serve the presentable proper step message display on the screen for the other submission compliance includes the other submission compliance serving the proper step message display on the screen of the device and the other submission compliance serving the presentable proper step message display on the screen further comprising to receive unapproved documentation and resolve the required documentation.

13. The method set forth in claim 1 wherein the proper step message display to serve the-presentable proper step message display on the screen for the other submission compliance includes the other submission compliance serving the proper step message display on the screen of the device and the other submission compliance serving the presentable proper step message display on the screen further comprising transmitting a correct statue to the presentable proper step message display on the screen of the submission compliance device; The submission compliance device further comprising the capabilities to take the proper step or steps.

14. The method set forth in claim 1 wherein the proper step message display to serve the presentable proper step message display on the screen for the other submission compliance includes the submission compliance device serving the proper step message display on the screen of the device and the other submission compliance serving the presentable proper step message display on the screen further comprising the submission compliance device receiving the required documentation and transmitting a correct statue to the other submission compliance device; the other submission compliance device with the capabilities to take the proper step or steps.

15. The method set forth in claim 1 wherein the proper step message display to serve the presentable proper step message display on the screen for the other submission compliance includes the other submission compliance device serving the proper step message display on the screen of the device and the other submission compliance serving the presentable proper step message display on the screen further comprising the other submission compliance device receiving the required documentation and transmitting a correct statue to the submission compliance device; the submission compliance device with the capabilities to take the proper step or steps.

16. The method set forth in claim 1 wherein the proper step message display to serve the presentable proper step message display on the screen for the other submission compliance includes the other submission compliance device serving the proper step message display on the screen of the device and the other submission compliance serving the presentable proper step message display on the screen further comprising updating a correct statue and transmitting a correct statue from a statue resolving application on a server, smart phone application, web application, web service, interface, or any other technological service.

17. The method set forth in claim 1 wherein the proper step message display to serve the presentable proper step message display on the screen for the other submission compliance includes the other submission compliance device serving the proper step message display on the screen of the device and the other submission compliance serving the presentable proper step message display on the screen further comprising analyzing a (DPI) and transmitting a compliant DPI from an application on a server, smart phone application, web application, web service, interface, or any other technological service.

18. The method set forth in claim 1 wherein the proper step message display to serve the presentable proper step message display on the screen for the other submission compliance includes the submission compliance device serving the proper step message display on the screen of the device or the other submission compliance, and the submission compliance or the other submission compliance serving the presentable proper step message display on the screen further comprising analyzing the dots per inch requirement, updating the dots per inch requirement, analyzing information on the documentation, validating the information on the documentation with a database, and transmitting compliant information.

19. The method set forth in claim 1 wherein the proper step message display to serve the presentable proper step message display on the screen for the other submission compliance includes the submission compliance device serving the proper step message display on the screen of the device or the other submission compliance, and the submission compliance or the other submission compliance serving the presentable proper step message display on the screen further comprising to take the proper step or steps networked or connected to the submission compliance device application or the other submission compliance application with any other technological service.

20. The method set forth in claim 1 wherein the proper step message display to serve the presentable proper step message display on the screen for the other submission compliance includes the submission compliance device serving the proper step message display on the screen of the device or the other submission compliance, and the submission compliance or the other submission compliance serving the presentable proper step message display on the screen further comprising an automated system transmitting compliant information on the required documentation with any other technological serve.

21. The method set forth in claim 1 wherein the proper step message display to serve the presentable proper step message display on the screen for the other submission compliance includes the submission compliance device serving the proper step message display on the screen of the device or the other submission compliance, and the submission compliance or the other submission compliance serving the presentable proper step message display on the screen further comprising applying the driver license, tag/registration, insurance, or proof of defective equipment technological service.

* * * * *

UNITED STATES PATENT AND TRADEMARK OFFICE
CERTIFICATE OF CORRECTION

PATENT NO. : 12,210,580 B2
APPLICATION NO. : 17/903408
DATED : January 28, 2025
INVENTOR(S) : Lazaro Rodriguez It is certified that error appears in the above-identified patent and that said Letters Patent is hereby corrected as shown below:

In the Claims

Column 13, Line 49, "statue" should read "statute"
Column 14, Line 7, "correct statue, update correct statue" should read "correct statute, update correct statute"
Column 14, Line 19, "statue" should read "statute"
Column 14, Line 20, "statue" should read "statute"
Column 15, Line 17, "statue" should read "statute"
Column 15, Line 31, "statue" should read "statute"
Column 15, Line 43, "statue" should read "statute"
Column 15, Line 53, "statue" should read "statute"
Column 15, Line 54, "statue from a statue" should read "statute from a statute"

Signed and Sealed this
Eighth Day of April, 2025

Coke Morgan Stewart
*Acting Director of the United States Patent and Trademark Office*